United States Patent [19]

Murata et al.

[11] Patent Number: 5,036,208

[45] Date of Patent: Jul. 30, 1991

[54] LUMINESCENT SCREEN

[75] Inventors: Yasushi Murata; Fumio Matsui, both of Saitama, Japan

[73] Assignee: Pioneer Electronic Corporation, Tokyo, Japan

[21] Appl. No.: 380,493

[22] Filed: Jul. 17, 1989

[30] Foreign Application Priority Data

Jan. 17, 1989 [JP] Japan .................................. 1-8388

[51] Int. Cl.[5] .............................................. G03B 42/00
[52] U.S. Cl. ............................ 250/487.1; 250/484.1 B; 250/488.1
[58] Field of Search ............ 250/488.1, 487.1, 484.1 B

[56] References Cited

U.S. PATENT DOCUMENTS 4,567,371  1/1986  Ishizuka et al. .................. 250/483.1
4,789,785  12/1988  Yamazaki et al. ................ 250/487.1

FOREIGN PATENT DOCUMENTS 59-200228  11/1984  Japan .......................... 250/484.1 B
62-133399  6/1987  Japan .......................... 250/484.1 B Primary Examiner—Constantine Hannaher
Attorney, Agent, or Firm—Fleit, Jacobson, Cohn, Price, Holman & Stern

[57] ABSTRACT

A luminescent screen includes a screen plate containing a substance capable of emitting luminescent light in response to stimulating light applied thereto, and a reflecting layer on one surface of the screen plate for directing emitted luminescent light from a reverse surface of the screen plate toward a display surface thereof. The brightness of the display surface is therefore increased.

3 Claims, 3 Drawing Sheets

STIMULATING LIGHT

STIMULATING LIGHT

LUMINESCENT SCREEN

BACKGROUND OF THE INVENTION

1. Field of the Invention

The present invention relates to a luminescent screen, and more particularly to a luminescent screen having a screen plate containing a substance capable of emitting light in response to stimulating light applied thereto.

2. Description of the Prior Art

There are known display systems having a luminescent screen comprising a screen plate which contains a substance (a luminescent substance) capable of fluorescence or phosphorescence in response to stimulating light such as ultraviolet radiation, visible light, near-infrared radiation, or the like, the fluorescent substance comprising a piperidinium tetra (benzoyltrifluoroacetone) europium complex, for example. The stimulating light is applied to the screen plate to enable the screen plate to display an image.

Heretofore, the screen plate has generally been in the form of a flat plastic plate. As shown in FIG. 1 of the accompanying drawings, when stimulating light is applied to a plastic screen plate 40, luminescent light is emitted from a luminescent substance (indicated by a star-shaped symbol) and scattered in every direction as indicated by the broken lines. More specifically, the emitted luminescent light is directed toward display and reverse surfaces of the screen, and also propagated in the screen plate 40. Therefore, The efficiency with which the applied stimulating light is utilized is low, and the intensity of luminescent light emitted toward the display side of the screen plate is so low that the screen as viewed by the viewer is relatively dark.

SUMMARY OF THE INVENTION

In view of the aforesaid drawbacks of the conventional luminescent screen, it is an object of the present invention to provide a luminescent screen which emits luminescent light of an increased intensity toward a display side for a greater degree of screen brightness in response to a reference intensity of stimulating light applied to the screen.

According to the present invention, a luminescent screen comprises a screen plate containing a substance capable of emitting luminescent light in response to stimulating light applied thereto, and a reflecting layer disposed on one surface of the screen plate.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
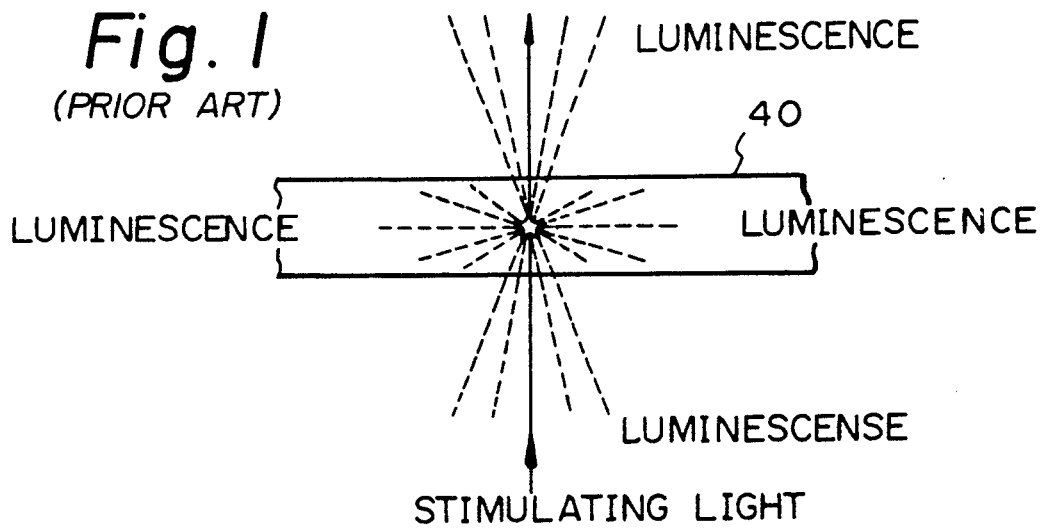
FIG. 1 is a fragmentary cross-sectional view of a conventional luminescent screen.
Figure 2A:
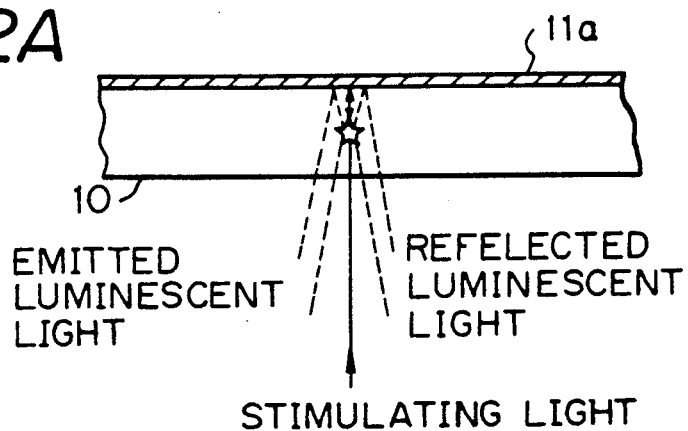
FIGS. 2(A) and 2(B) are fragmentary cross-sectional views of a luminescent screen according to an embodiment of the present invention.
Figure 2B:
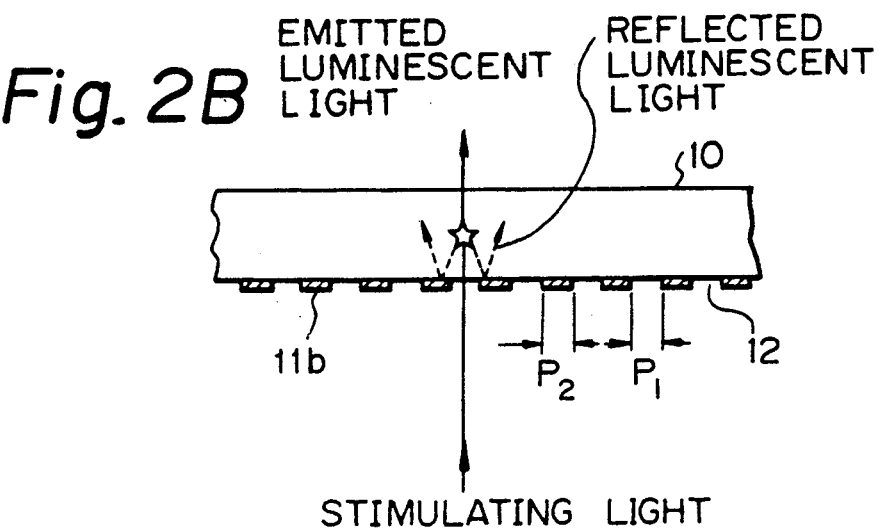

FIGS. 2(A) and 2(B) show a luminescent screen according to an embodiment of the present invention. In each of FIGS. 2(A) and 2(B), the luminescent screen includes a screen plate 10 made of plastics. Stimulating light (indicated by the solid line) such as ultraviolet radiation or the like is applied as a spot to the screen while the spot is being two-dimensionally scanned over the screen. A luminescent substance indicated by the star-shaped symbol is responsive to the applied stimulating light for emitting luminescent light as indicated by the broken lines. The size of a pixel is governed by the size of the spot applied to the screen.

The luminescent screen shown in FIG. 2(A) is constructed so as to be incorporated in a front projector. The screen includes a reflecting layer 10a disposed on the reverse surface of the screen plate 10 which is opposite to the surface thereof to which the stimulating light is applied. The reflecting layer 11a is formed as a metal film evaporated over the entire reverse surface of the screen plate 10. The luminescent light (indicated by the broken lines) directed toward the reverse surface of the screen plate 10 is therefore reflected back toward the viewer by the reflecting layer 11a.

The luminescent screen illustrated in FIG. 2(B) is constructed for use in a rear projector. The screen includes a reflecting layer 11b disposed on the reverse surface of the screen plate 10 to which stimulating light is applied. The reflecting layer 11b is formed as metal film evaporated over the surface of the screen plate 10 except those areas corresponding to pixels defined by the spot of stimulating light. The luminescent light (indicated by the broken lines) directed toward the reverse surface of the screen plate 10 is therefore reflected back toward the viewer by the reflecting layer 11b. The reflecting layer 11b has through holes 12 corresponding to the pixels and through which the stimulating light passes into the screen plate 10. While the reflecting layer 11b is preferably in the form of a mesh, it may be of a stripe pattern. If it is assumed that each of the holes 12 has a diameter of $P_1$ and a portion of the reflecting layer 11b between two adjacent holes 12 has a width of $P_2$, then the screen should preferably be constructed to meet the following relationships:

$P_1 \geq$ the diameter of the stimulating light spot; and
$P_1 \geq P_2 \geq \frac{1}{2} P_1$ With the reflecting layer 11a or 11b on the reverse surface of the screen plate 10, the luminescent light emitted in response to stimulating light and directed toward the reverse surface of the screen plate 10 is reflected by the reflecting layer 11a or 11b toward the display surface. Therefore, the intensity of luminescent light which reaches the viewer of the screen is increased, and the screen brightness with respect to a reference intensity level of stimulating light is increased. In the arrangement of FIG. 2(A) in which the screen is used in a front projector, the applied stimulating light which has heretofore been passed through the reverse surface of the screen plate 10 is reflected by the reflecting layer 11a back into the screen plate 10. Accordingly, the efficiency with which the stimulating light is utilized is increased, and the screen brightness is almost twice higher than the screen brightness of the conventional screen.

Figure 3A:
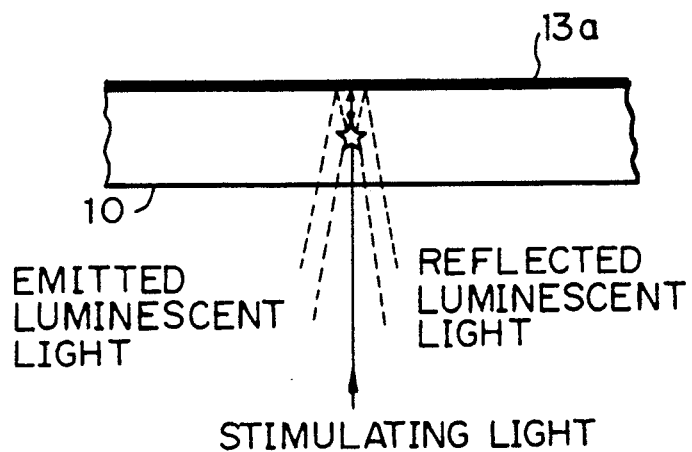
FIGS. 3(A) and 3(B) are fragmentary cross-sectional views of a luminescent screen according to another embodiment of the present invention.
Figure 3B:
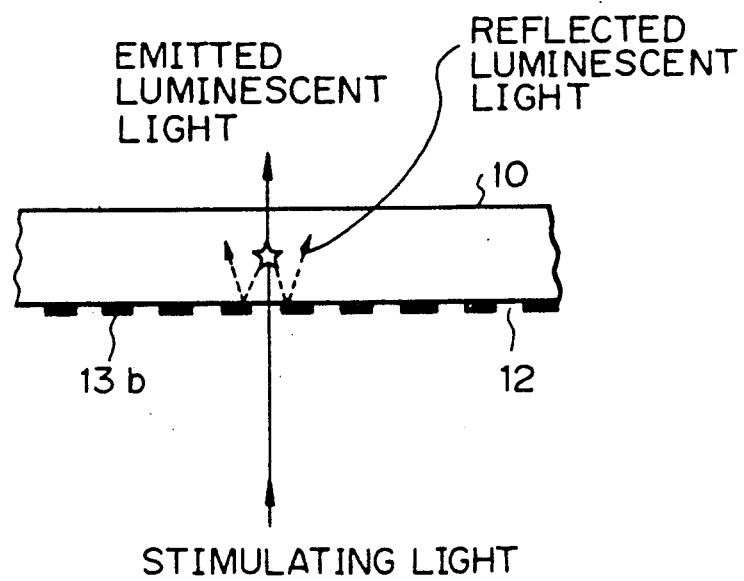

FIGS. 3(A) and 3(B) show a luminescent screen according to another embodiment of the present invention. As shown in FIGS. 3(A) and 3(B), dark films 13a, 13b, such as black films, of high light absorption capability are disposed respectively as the reflecting layers 11a, 11b (FIGS. 2(A) and 2(B)) on the screen plate 10. The black films 13a, 13b may comprise evaporated carbon films produced by the carbon arc process.

When no stimulating light is applied, the screen brightness is lower than a normal level. When stimulating light is applied, most of emitted luminescent light which is directed toward the dark film 13a or 13b is absorbed, but a portion of the luminescent light is reflected thereby toward the display surface. The intensity of luminescent light emitted toward the viewer is thus increased, increasing the screen brightness with respect to a reference intensity level of stimulating light. If it were not for the dark film 13a or 13b, the ratio of the screen brightness when no stimulating light is applied to the screen brightness when stimulating light is applied would range from 3 to 4. With the dark film 13a or 13b provided, the screen brightness ratio is increased to about 18, and hence the contrast is increased.

Figure 4A:
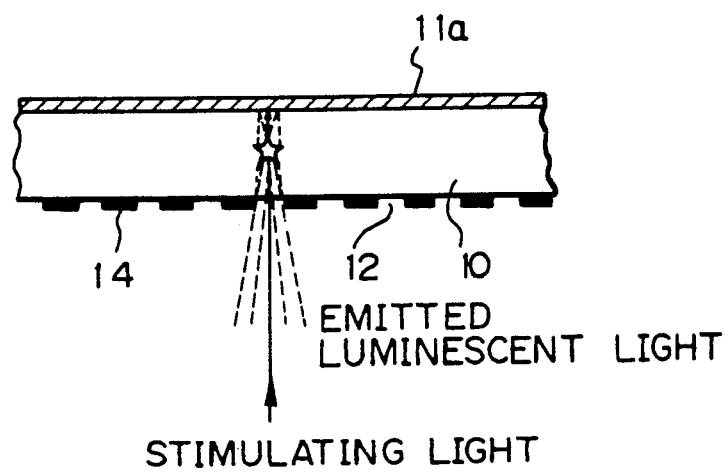
FIGS. 4(A) and 4(B) are fragmentary cross-sectional views of a luminescent screen according to still another embodiment of the present invention.
Figure 4B:
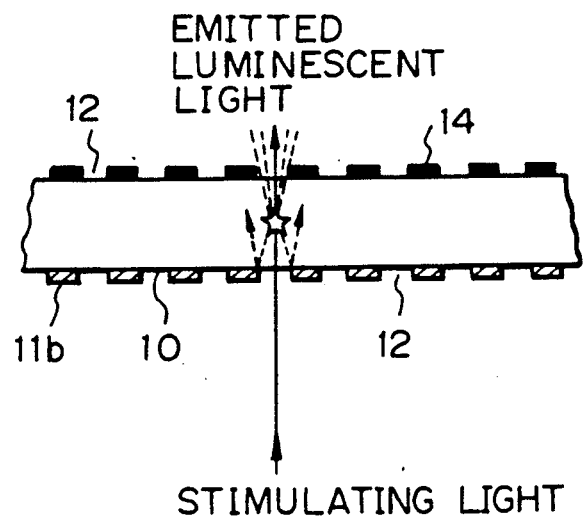

FIGS. 4(A) and 4(B) show a luminescent screen according to still another embodiment of the present invention. The screen arrangements of FIGS. 4(A) and 4(B) comprise the screen structures shown in FIGS. 2(A) and 2(B), respectively, which are further combined with dark films 14 such as black films each disposed on the display surface of the screen plate 10. Each of the dark films 14 is in the form of an evaporated carbon film, for example, deposited in areas except for pixel regions defined by a spot of stimulating light applied to the screen plate 10. The dark film 14 has through holes 12 corresponding to the respective pixels and through which the stimulating light passes.

The dark film 14 disposed on the display surface of the screen plate 10 except for the pixel regions allows luminescent light (indicated by the broken lines) emitted in response to stimulating light to be directed only through the holes 12 toward the viewer. As the luminescent light passes through the limited areas, i.e., the holes 12, crosstalk due to emission interference between the pixels is lowered, and the contract is increased.

It is possible to employ a reflecting film such as an evaporated metal film in place of the dark film 14 having high light absorption capability. These dark films 14 shown in FIGS. 14(A) and 14(B) may be used in combination with the screen constructions shown in FIGS. 3(A) and 3(B), or may be used singly on screen plates for the reduction of crosstalk rather than in combination with the screens shown in FIGS. 2(A), 2(B), 3(A), and 3(B).

With the luminescent screen of the present invention, the reflecting layer is provided on the reverse surface of the screen plate, which is opposite to the display surface thereof, so that luminescent light emitted in response to stimulating light and directed toward the reverse surface is reflected by the reflecting surface toward the display surface. Consequently, the intensity of luminescent light which reaches the viewer of the screen is increased, and the screen brightness with respect to a reference intensity level of stimulating light is increased.

Use of the dark film is effective in increasing the ratio of the screen brightness when no stimulating light is applied to the screen brightness when stimulating light is applied, resulting in a higher degree of contrast.

The reflecting layer or dark film provided on the display surface of the screen plate except for the pixel regions causes the emitted luminescent light to pass through limited areas. With such an arrangement, crosstalk due to emission interference between the pixels can be reduced.

Although certain preferred embodiments have been shown and described, it should be understood that many changes and modifications may be made therein without departing from the scope of the appended claims.

What is claimed is:

1. A luminescent screen comprising:
    a screen plate having front and rear faces, light being projected through said front face of said screen plate;
    luminescent material being contained in said screen plate between said front and rear faces and responsive to said light projected through said front face to emit luminescent light;
    a layer of reflective material being disposed on said rear face of said screen plate for reflecting said luminescent light outward through said front face of said screen plate; and
    a layer of light absorbing material being disposed on said front face of said screen plate, said layer of light absorbing material being disposed so as to cover the front face of said screen plate at spaced intervals, a spacing being provided between adjacent covered regions on said front face corresponding to a spacing of pixel regions defined by light projected through the front face of said screen plate.

2. A luminescent screen comprising:
    a screen plate having front and rear faces, light being projected through said rear face of said screen plate;
    luminescent material being contained in said screen plate between said front and rear faces and responsive to said light projected through said rear face to emit luminescent light;
    a layer of reflective material being disposed on said rear face of said screen plate so as to cover said rear face at spaced intervals, a spacing being provided between adjacent covered regions on said rear face corresponding to pixel regions defined by light projected through said rear face of said screen plate, said layer of reflective material reflecting said luminescent light outward through said front face of said screen plate; and
    a layer of light absorbing material being disposed on said front face of said screen plate, said layer of light absorbing material being disposed so as to cover the front face of said screen plate at spaced intervals, a spacing being provided between adjacent covered regions on said front face corresponding to said spacing of adjacent covered regions of said layer of reflective material.

3. A luminescent screen comprising:
    a screen plate having front and rear faces, light being projected through said rear face of said screen plate;
    luminescent material being contained in said screen plate between said front and rear faces and responsive to said light projected through said rear face to emit luminescent light; and
    a layer of light absorbing material being disposed on said rear face of said screen plate so as to cover said rear face at spaced intervals, a spacing being provided between adjacent covered regions on said rear face corresponding to pixel regions defined by light projected through said rear face of said screen plate, said layer of light absorbing material increasing the intensity of said luminescent light reflecting outward through said front face of said screen plate.

* * * * *